United States Patent [19]
Foster et al.

[11] 3,723,586
[45] Mar. 27, 1973

[54] PROCESS OF EXTRUDING A FOAMABLE THERMOPLASTIC RESIN

[75] Inventors: William Rees Foster, Cwmbran; Stanley John Skinner, Newport, both of England

[73] Assignee: Monsanto Chemicals Limited, London, England

[22] Filed: May 2, 1968

[21] Appl. No.: 726,061

[30] Foreign Application Priority Data

May 5, 1967    Great Britain...................21,006/67

[52] U.S. Cl. ....................264/53, 264/47, 264/54
[51] Int. Cl. ......................B29d 7/04, B29d 27/00
[58] Field of Search........264/53, 54, 47; 18/13, 12 F

[56] References Cited

UNITED STATES PATENTS

| | | | |
|---|---|---|---|
| 2,766,481 | 10/1956 | Henning | 264/47 |
| 2,766,480 | 10/1956 | Henning | 264/47 |
| 2,848,739 | 8/1958 | Henning | 264/53 |
| 3,121,130 | 2/1964 | Wiley et al. | 264/53 |
| 3,321,804 | 4/1967 | Breidt, Jr. et al. | 18/13 |
| 3,427,371 | 2/1969 | Skinner | 18/12 F |

*Primary Examiner*—Donald J. Arnold
*Attorney*—Patricia J. Hogan, Arthur E. Hoffman and Herbert B. Roberts

[57] ABSTRACT

Dies and processes for extruding a foamable thermoplastic synthetic resin through a plurality of channels and passages extending from the inlet to the outlet end of a die, each of the channels communicating with a network of slits at the outlet end of the die and each of the passages having its outlet substantially in the center of a mesh of the network of slits, at least the majority of the passages having grooves extending from the outlet end of the passage toward the outlet of its surrounding mesh of slits to ensure that a strand of foamed resin extruded from the passage substantially fills the space formed by the enveloping foamed resin issuing from the surrounding mesh of slits.

6 Claims, 2 Drawing Figures

PATENTED MAR 27 1973

3,723,586

INVENTORS
WILLIAM R. FOSTER
STANLEY J. SKINNER
BY Patricia J. Hogan
Agent 3,723,586

A PROCESS OF EXTRUDING A FOAMABLE THERMOPLASTIC RESIN

BACKGROUND OF THE INVENTION

1. Field of the Invention

This application relates to the extrusion of foamable thermoplastic synthetic resins and more particularly relates to improved dies and processes for extruding such resins to form foamed products, e.g., low density boards, which are strong and have a good appearance.

2. Description of the Prior Art

Particularly because of their excellent heat-insulating properties, foamed resins are useful industrial products. These products are often made by molding processes, but extrusion processes are generally considered to be more practical for the formation of foamed resins. However, extrusion processes have not been entirely successful for all purposes. For example, it is difficult to produce foamed polystyrene having a substantial thickness by extrusion because the extruded board is apt to have a wrinkled surface and is liable to warp and exhibit collapse of the foamed cells.

To a large extent, the deficiencies of extrusion processes in forming, e.g., foamed polystyrene boards, have been overcome by the use of the processes and dies disclosed in copending U.S. applications Ser. Nos. 376,089 and 555,495, filed June 18, 1964, and June 9, 1966, respectively, in the names of Samuel Baxter and John H. Gilbert. The former application, now U.S. Pat. No. 3,406,230, discloses a process for extruding a foamable thermoplastic resin through a die having at its inlet end a plurality of separate channels communicating with a slit at the outlet end of the die under such conditions that the streams of resin emerging from the channels coalesce in the slit before any substantial amount of foaming is allowed to occur. In a preferred embodiment of the invention, there is a network of slits at the outlet end of the die, each slit having its associated row of channels. Strong foamed boards having a good appearance can be prepared by this process, but it has been found that the process sometimes leads to the formation of products having voids, or hollow passageways, which have a deleterious effect on the strength and surface appearance of the product.

U.S. application Ser. No. 555,495, now U.S. Pat. No. 3,467,570, discloses a method of overcoming this deficiency of the process by providing substantially central passages in the majority of the meshes of the network of slits so that a strand of foamed resin is extruded from each passage and is enveloped by foamed resin issuing from the slits of the network. Usually this process works well in practice, but it has been found difficult in some circumstances to ensure that the strand of foamed resin extruded from each passage completely fills the space formed by the enveloping foamed resin issuing from the slits of the network.

SUMMARY OF THE INVENTION

An object of the invention is to provide novel dies and processes for extruding foamable thermoplastic synthetic resins.

Another object is to provide novel dies and processes for preparing extruded foamed boards, particularly low density boards, having good strength and appearance.

These and other objects are attained by extruding a foamable thermoplastic synthetic resin through a die having at its inlet end a plurality of channels communicating with slits arranged to form the meshes of a network at the outlet end of the die, each of at least the majority of the meshes having a substantially central passage leading back from the outlet end of the die to the inlet end of the die, and each of at least the majority of the passages having grooves extending from the outlet end of the passage toward the outlet of its surrounding mesh of slits to ensure that a strand of foamed resin extruded from the passage substantially fills the space formed by the enveloping foamed resin issuing from the surrounding mesh of slits.

DESCRIPTION OF THE DRAWING

An extrusion die of the invention is exemplified (not to scale) in the drawing, in which.

Figure 1:
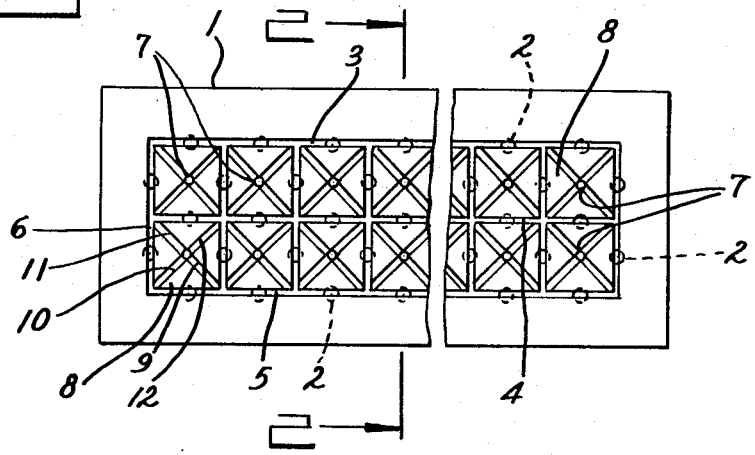
FIG. 1 is a front elevation of the die and FIG. 2 is a section along the line 2—2 in FIG. 1.
Figure 2:
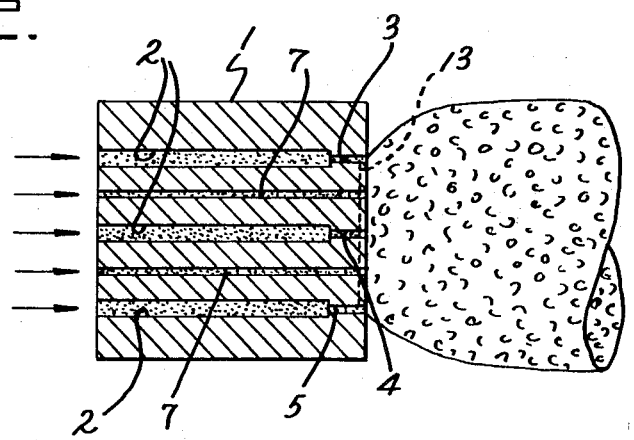

The die comprises a mild steel block 1 having a number of cylindrical channels 2 extending into it from one side. The channels are arranged to communicate with a rectangular network of intercommunicating horizontal and vertical slits, including those designated 3, 4, 5, and 6. There are also cylindrical passages 7 extending completely through the block, each passage being positioned centrally in one of the square meshes 8 of the network of slits. A series of diagonal grooves, including those designated 9, 10, 11, and 12, are cut into the front face of the die to a depth indicated by the dotted line 13 in FIG. 2 and extend from the outlet of each channel to the four corners of its surrounding mesh of slits. The die has means (not shown) for attaching it to the front of an extruder so that a foamable thermoplastic synthetic resin can be fed into it in the direction of the arrows in FIG. 2.

DESCRIPTION OF THE PREFERRED EMBODIMENTS

The following example is given to illustrate the invention and is not intended as a limitation thereof.

EXAMPLE

Charge polystyrene pellets in admixture with 0.25 percent by weight of finely-divided silica to an extruder having a barrel diameter of 2.5 inches, means for injecting isobutene into the barrel, and an adjustable pressure-reducing valve behind a die of the type described above and illustrated in the drawing; said die having at its outlet end four 17-inch-long horizontal slits and 69 0.75-inch-long vertical slits defining a network of square meshes having 0.25-inch-long sides; each slit being 0.035 inch wide; the four slits defining the periphery of the network having a land of 0.5 inch, and the other slits having a land of 0.375 inch; each vertical slit having three cylindrical channels communicating with it, and each horizontal slit having 68 channels communicating with it; each channel having a diameter of 0.052 inch; the land of the channels communicating with the inner slits being 0.625 inch, and the land of the channels communicating with the peripheral slits being 0.5 inch; each mesh of the network being provided with a central passage passing right through the die and having a land of 1 inch and a diameter of 0.052 inch; each central passage being connected to each of the four corners of the surrounding mesh by a groove having a width of 0.025 inch and a depth of 0.03125 inch.

Extrude the polystyrene pellets and finely-divided silica through the die at a die temperature of 120°C. under a barrel pressure of about 3,500 psi, and a pressure of about 700 psi. immediately behind the die, while injecting isobutene to produce within the extruder a foamable composition containing 14 percent by weight of isobutene, so that the foamed polystyrene issues from the die at a linear speed of about 5.7 feet per minute, the throughput being 140 pounds per hour. Pull the produce away from the die by means of a caterpillar take-off.

The product is a well-consolidated board of foamed polystyrene having substantially flat surfaces, a width of 26 inches, thickness of 1.62 inches, and a density of 1.4 pounds per cubic foot. Examination of a cross-section of the board shows that the foamed polystyrene extruded from the slits forms a coherent matrix within which are set strands of foamed resin extruded from the passages. No voids can be distinguished between the strands and the matrix, the strands completely filling the spaces in the matrix.

The processes and dies of the invention are of particular value in the production of foamed boards, i.e., flat sheet materials having a substantial thickness, usually at least 0.75 inch and often 1.5–4 inches. Such boards, e.g., low density foamed polystyrene boards, are useful as insulating materials in a wide variety of circumstances.

In the practice of the invention, it is usually preferable that the pressure within the die be sufficient to prevent substantial foaming of the resin before it leaves the slits and that the relationship between the dimensions of the channels and the slits be such that the streams of resin issuing from the channels spread out to fill the slits and coalesce while still in the substantially unfoamed state. However, it is not necessary to prevent foaming of the resin the slits. In fact, it is sometimes useful to permit some foaming in the slits, provided that the foaming does not occur so far back in the slits that the streams of resin issuing from the channels coalesce simply by virtue of the degree of foaming of the individual streams.

For the production of a uniform and regular board, it is normally preferable to employ a die having slits arranged in a symmetrical network of meshes, backed up by a uniformly arranged series of channels, with each mesh having its own substantially centrally located passage and each passage its associated grooves in the front face of the die. It is often preferred that the network be composed of square meshes. Dies of the preferred types are very suitable for the production of foamed polystyrene board.

It is preferred that each passage should have its associated grooves in the front face of the die. Each groove extends from the outlet end of its associated passage toward the outlet of the surrounding mesh of slits and preferably extends completely to the slits, although it can extend only part, e.g., half, of the way if desired. Preferably the grooves extend from an associated passage toward those parts of the surrounding mesh of slits that are furthest away from the passage. For example, when a square mesh system is used, the grooves preferably extend from an associated passage toward the four corners of the surrounding mesh of slits; and, when a polygonal mesh system is used, each passage preferably has associated with it as many grooves as there are corners to the mesh surrounding it. With the grooves arranged in this way, the resin issuing from the passages is better able to fill the spaces enveloped by resin issuing from the slits, because expansion is slightly more rapid along the lines of the grooves than in other directions. This result is particularly noticeable in the case of a network composed of square meshes.

The channels in the die are normally circular in cross-section but are not necessarily circular. For example, they can be of some shape that is substantially circular and can be said to possess a diameter, e.g., hexagonal, or even square. Their other dimension, i.e., the land, is that along the direction of the flow of the resin. Preferably the channels have a circular cross-section and are arranged symmetrically behind the network of slits.

As mentioned above, the relationship between the dimensions of the channels and the dimensions of the slits is preferably such that the streams of resin issuing from the channels spread out to fill the slits and coalesce while still in the substantially unfoamed state. To assist in ensuring coalescence before substantial foaming, both the resistance to flow offered by the slits and the residence time of the foamable resin within them are preferably relatively high. Although these quantities are partly determined by the rheological properties of the foamable resin, they are best controlled by means of a suitable choice of dimensions of the slit and of the channels.

The dimensions of the slits are measured in terms of the land, i.e., the measurement along the direction of resin flow, and the cross-section, which is made up of the width and the length, the length being the larger of these two linear dimensions. The width of the slits is generally less than the diameter of the channels positioned behind it; for instance, the diameter of the channels is often 1.3–10, especially 1.3–5 times the width of the slits. The network of slits is generally made up of a number of straight intercrossing slits, and the overall shape of the network corresponds to the cross-sectional shape of the extruded product. Preferably a number of straight slits are arranged so that a series of them are parallel to one another with another parallel series crossing them to form a network, each slit having its associated row of channels. A network of slits can also, e.g., be in the form of a rectangular or triangular grid, for instance a series of squares or a six-pointed star within a hexagon. The length of the network (viewed from the outlet end of the die) can be as much as desired, for instance from a few inches to 60 inches or even more, depending on the dimensions desired in the final extruded foamed resin. The width of each slit bears some relationship to the desired thickness of the extruded resin, but it is also dictated to some extent by the maximum practical extrusion rate and the degree of coalescence that can be achieved between the streams of unfoamed resin issuing from the channels. Generally a slit width of 0.01–0.25 inch, e.g., 0.02–0.1 inch, especially about 0.035 inch, is suitable. The land of the slits can for instance be 0.05–2 inches, especially 0.1–0.5 inch.

The land of the channels is preferably 0.5–20 times the land of the slits. For example, when polystyrene is to be extruded, the land of the channels can be, for instance, 1.6–3 times the land of the slits; when polyethylene is to be extruded, the land of the channels can be, for instance, 2–6 times the land of the slits. For other resins the ratio can be more or less than these values, depending on whether the viscoelastic memory of the resin is low or high, so as to minimize memory effects and give good coalescence of the streams of resin issuing from the channels.

The passages within the meshes of the network of slits can have a cross-section that is similar to the shape of the meshes which surround them, but they need not be identical. For instance, a square mesh can have a passage that has a square, circular, or polygonal cross-section; a triangular or rectangular network can have passages whose cross-sections are, respectively, a triangle and a rectangle, etc. Moreover, the cross-section need not be the same along the entire length of the passage. For example, the passage can have a restricted cross-section at its outlet end, or the cross-section can be circular over most of its length with only its outlet end of similar shape to the mesh it occupies. There can be more than one passage, e.g., two or three passages, within each mesh if desired. Also, although it is preferred that every mesh in a network have its accompanying passage, it is possible for a certain distribution of the meshes to contain no passages, provided that at least the majority of the meshes are provided with passages.

The passages pass straight through the die from the front to the back so that they are fed with foamable resin from the screw of the extruder. In practice the cross-sectional area of a passage is preferably not more than 0.2 square inch, so that the pressure in the extruder is not reduced too much. For example, the diameter of the passages can be 0.02–0.1 inch, such as 0.03–0.07 inch, for instance about 0.05 inch.

The grooves in the front face of the die are preferably straight and of square or rectangular cross-section, but they can be slightly curved or have a semi-cylindrical or other cross-section if desired. The function of the grooves is to assist in ensuring that the strand of foamed resin issuing from the passage is of such a shape that it substantially fills the space formed by the enveloping foamed resin issuing from the slits. This is achieved by making use of the more rapid expansion along the grooves of foaming resin issuing from the passages and by directing the grooves toward those parts of the surrounding mesh of slits that are furthest from the central passage. The cross-sectional dimensions of the grooves affect the directional distribution of the expanding resin from the passages, a larger groove having a greater effect than a smaller one. Good results are often obtained by using grooves that have a width and depth of a similar order to the width of the slits of the die, i.e., one half to twice the width of the slits. In absolute terms good results are often obtained employing grooves that are 0.005–0.3 inch wide and 0.02–0.08 inch deep. For example, when using a square mesh slit system wherein the slits have a width of 0.035 inch and a land of 0.375 inch, and the passages have a diameter of 0.052 inch, excellent results are obtained using grooves which have a width of 0.02 inch and a depth of 0.03125 inch. The cross-section can vary along the length of the groove if desired.

The foaming resin issuing from the passages and from the network of slits expands in the atmosphere, the foaming resin issuing from the passages expanding to fill the spaces formed by the foaming resin issuing from the slits. To ensure that sufficient resin is available to fill the spaces, the cross-sectional area of each passage is often conveniently such that 15–40 percent, preferably 20–30 percent, of the total extruding polymer passes through the passages. When there are several passages within each mesh, it is, of course, their combined cross-sectional area that must be considered.

The overall size of the die is governed by the cross-section of the foamed section that is to be produced by extrusion. In general, expansion takes place along the width and the length of the die aperture (the network of slits), although the former expansion is the greater. For instance, a board that is 1.5 inches thick can be produced from a die that is relatively narrow, e.g., 0.5 inch, in width.

The resins which are extruded in accordance with the present invention are thermoplastic synthetic resins, preferably polymers of one or more vinylidene monomers, e.g., hydrocarbon monomers such as ethylene, propylene, butadiene, styrene, alpha-methylstyrene, o-, m-, or p-methylstyrene, other ar-alkylstyrenes, etc., and substituted monomers such as acrylonitrile, methacrylonitrile, vinyl chloride, vinyl acetate and other vinyl esters, methyl acrylate, ethyl acrylate, propyl acrylate, butyl acrylate, the corresponding alkyl methacrylates, etc. It is particularly preferred to employ a vinylidene aromatic resin, i.e., a polymer of one or more vinylidene aromatic monomers, such as styrene, chlorostyrene, vinyltoluene, alpha-methylstyrene, etc., including interpolymers of one or more vinylidene aromatic monomers with minor amounts, e.g, up to about 30 percent, based on the total weight of monomers, of other vinylidene monomers such as acrylonitrile, methacrylonitrile, vinyl chloride, vinyl acetate, alkyl acrylates and methacrylates, etc. The invention is particularly applicable to polystyrene resins, such as polystyrene itself or a toughened polystyrene, i.e., a polystyrene having physically or chemically combined therewith a minor proportion, e.g., 1–15 percent by weight, of a natural or synthetic rubber, e.g., substantially linear or branched polymers of conjugated dienes, such as butadiene, isoprene, etc., including copolymers thereof with lesser amounts of comonomers such as styrene, acrylonitrile, methyl methacrylate, etc.

Since the resin used in the practice of the invention is foamable, it of course is in admixture with a blowing agent, which is preferably a volatile substance, e.g., a volatile liquid. In many cases the blowing agent is one that is a gas or vapor under normal atmospheric conditions (such as 20°C. and 1 atmosphere pressure), but which will be present in solution in the molten or semi-molten thermoplastic resin while under pressure before extrusion. Exemplary of volatile substances that can be used are lower aliphatic hydrocarbons such as ethane, ethylene, propane, propylene, isobutene, butadiene, butane, isoprene, a pentane, a hexane, etc.; lower alkyl halides such as methyl chloride, dichlorodifluoromethane, trichloromethane, or 1,2-dichlorotetrafluoroethane, etc.; and inorganic gases such as carbon dioxide or nitrogen. The lower aliphatic hydrocarbons, especially butane and isobutene, are preferred. The blowing agent can also be a chemical blowing agent, e.g., a bicarbonate such as sodium bicarbonate, ammonium bicarbonate, etc., or an organic compound that yields nitrogen on heating such as dinitrosopentamethylenediamine, barium azodicarboxylate, etc. The amount of blowing agent employed is often in the range of 3–35 percent, especially 7–30 percent, based on the weight of the resin. For example, excellent results are achieved by the use of 7–15 percent by weight of butane or isobutene in conjunction with polystyrene.

The resin frequently also contains a nucleating agent, which assists in the formation of a large number of fine cells. The conventional nucleating agents can be employed, e.g., finely-divided inert solids such as silica or alumina, optionally in conjunction with zinc stearate, or small quantities of a substance that decomposes at the extrusion temperature to give a gas. Exemplary of the latter class of nucleating agents is sodium bicarbonate, optionally used in conjunction with a weak acid such as tartaric or citric acid. A small proportion of the nucleating agent, e.g., up to 5 percent by weight of the resin, is usually effective.

The blowing agent, especially when it is a volatile substance, is preferably mixed with the resin by injecting it into the barrel of the extruder used in the process. Alternatively, a premixed composition containing the blowing agent, e.g., foamable polystyrene beads containing pentane, can be fed to the extruder.

The extrusion temperature, i.e., the temperature of the die and the resin within it, depends to some extent on the softening point of the particular resin being extruded, but in general temperatures of 95°–180°C., preferably 100°–160°C., are suitable. For example, when foamable polystyrene is being extruded, a temperature in the range of 105°–135°C. is frequently used, while for polyethylene somewhat lower temperatures, e.g., 95°–110°C., are often very suitable.

The pressure within the die is usually sufficient to prevent any substantial foaming of the resin before it leaves the slits, and the pressure is preferably greater than the saturated vapor pressure of the blowing agent at the extrusion temperature when a condensable volatile substance is used as the blowing agent. For example, pressures greater than 250 psi., especially 250–1,500 psi., can be employed. Preferably, the pressure is 300–1,000 psi.

The processes and dies of the invention are of particular value in the production of extruded foamed material having a low density, e.g., 0.9–1.5 pound per cubic foot, and a substantial thickness, i.e., at least 0.75 inch and up to about 4 inches. However, denser products can be produced, although there is often little advantage to be gained by increasing it above 2 or 3 pounds per cubic foot. A density close to 1 pound per cubic foot, for instance 1–1.5, such as about 1.2 pounds per cubic foot is usually preferable. The thickness also can be outside the above limits, for instance as thin as 0.5 inch. A thickness of 1–2.5 inches, for instance in the region of 2 inches, is often very useful. When the product is a board, the width can be up to several feet, such as 2–4 feet, and the length can of course be as long as is desired. Foamed products apart from board are, e.g., those having a curved section such as is required in ceiling covings, pipe insulation, etc.

As produced from the die, the extruded resin, e.g., a board, has substantially flat upper and lower surfaces. Sometimes there is a slightly ribbed structure to the surface but not normally sufficient to prevent use of the extruded material for many purposes. In circumstances where a slightly uneven surface would otherwise be formed, the extruded material can be passed through means which bear lightly on the extruded surfaces and ensure that they are smooth. Exemplary of such means are a pair of rollers, moving belts, forming lips attached to the front face of the die, etc.

The detailed design of the die can be modified in many instances to assist in achieving an extruded material such as a board having smooth surfaces. For example, excellent results in this respect are obtained by ensuring that the land of the slits around the periphery of the die is longer than the land of the slits which make up the inner meshes of the network. The land of the peripheral slits can, e.g., be up to twice, for instance about 1.5 times, as long as that of the other slits of the network.

It is obvious that many variations can be made in the products and processes set forth above without departing from the spirit and scope of this invention.

What is claimed is:

1. A process which comprises extruding a foamable thermoplastic synthetic resin through a die having at its inlet end a plurality of channels communicating with slits arranged to form the meshes of a network at the outlet end of the die, each of at least the majority of the meshes having a substantially central passage leading back from the outlet end of the die to the inlet end of the die, and each of at least the majority of the passages having grooves extending from the outlet end of the passage toward the outlet of its surrounding mesh of slits to ensure that a strand of foamed resin extruded from the passage substantially fills the space formed by the enveloping foamed resin issuing from the surrounding mesh of slits; the pressure within the die being sufficient to prevent substantial foaming of the resin before it leaves the slits, and the relationship between the dimensions of the channels and the dimensions of the slits is such that the streams of resin issuing from the channels spread out to fill the slits and coalesce within the die while still in the substantially unfoamed state.

2. The process of claim 1 wherein the slits are arranged in a symmetrical network of meshes, backed up by a uniformly arranged series of channels, with each mesh having its own substantially central passage and each passage its associated grooves in the front face of the die.

3. The process of claim 2 wherein the meshes are square and the grooves extend from an associated passage toward the four corners of the surrounding mesh of slits.

4. The process of claim 3 wherein each groove extends completely from its associated passage to the slits.

5. The process of claim 1 wherein the resin is polystyrene.

6. The process of claim 1 wherein the foamable thermoplastic resin is a toughened polystyrene polymer or a polymer of at least one monomer selected from the group consisting of hydrocarbon monomers, acrylonitrile, methacrylonitrile, vinyl chloride, vinyl esters, alkyl acrylates, alkyl methacrylates and monovinylidene aromatic monomers.

* * * * *